July 8, 1952 R. H. GODDARD 2,602,290
ROTATIONAL FUEL FEED FOR COMBUSTION CHAMBERS
Filed May 7, 1947

INVENTOR.
Robert H. Goddard, Dec'd.
Esther C. Goddard, Executrix.
BY
Chas. T. Hawley
ATTORNEY.

Patented July 8, 1952

2,602,290

UNITED STATES PATENT OFFICE 2,602,290

ROTATIONAL FUEL FEED FOR COMBUSTION CHAMBERS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application May 7, 1947, Serial No. 746,614

1 Claim. (Cl. 60—39.46)

This invention relates to the feeding of two different combustion liquids to a combustion chamber of the type used in propulsion apparatus.

It is the general object of the invention to provide improved means for feeding two different combustion liquids in such manner that they will receive rotational movement around an annular intake channel as they enter the combustion chamber.

A further object is to provide means by which the two liquids will rotate as alternated and superposed films within said annular channel.

An important feature of the invention relates to the provision of partition means in the annular channel, adjacent the two opposite sides of which the two combustion liquids may be injected; and relates more specifically to the provision of a partition of serpentine formation, which permits the two liquids to be injected at successive points along the center line of the annular channel, while at the same time they are injected at opposite sides of the partition.

The invention further relates to arrangements and combinations of parts which will be hereinafter described and more particularly pointed out in the appended claim.

Preferred forms of the invention are shown in the drawing, in which

Referring to Figs. 1 to 4, a combustion chamber C of the non-rotating type is provided with the usual discharge nozzle N and with any usual ignition device 10. An annular channel member 12 is mounted in the rear end of the combustion chamber C and is retained in position by a metal ring 14 fixed within the chamber C.

Figure 1:
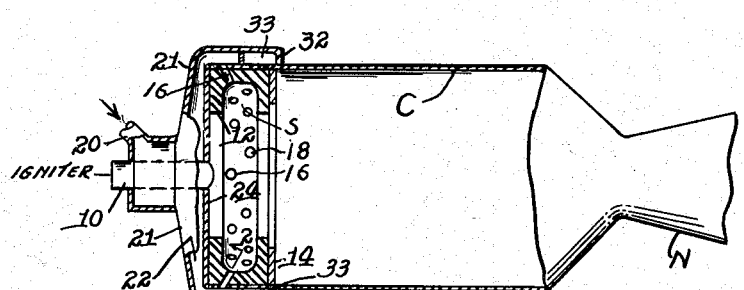
Fig. 1 is a sectional side elevation of a combustion chamber embodying this invention.
Figure 2:
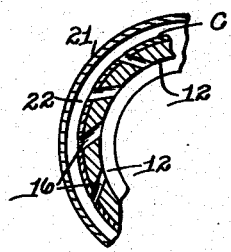
Fig. 2 is a partial sectional end elevation, taken substantially along the line 2—2 in Fig. 1.
Figure 3:
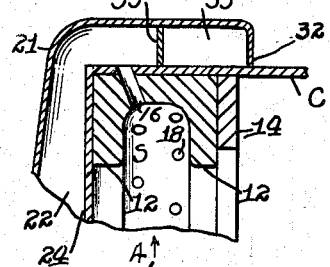
Fig. 3 is an enlarged sectional elevation of certain parts shown in Fig. 1.

The channel member 12 is also provided with two series of feed ports or openings 16 and 18 which are inclined toward the center line of the channel member 12, as clearly shown in Figs. 1 and 3, and which are also tangentially directed as shown in Fig. 2.

One of the combustion liquids, as liquid oxygen, is introduced through a pipe 20 (Fig. 1) to a hollow casing 21 forming a jacket space 22 between said casing 21 and the inner end portion 24 of the chamber C. The casing 21 extends around the end of the chamber C as shown in Figs. 1 and 3, and the jacket space 22 thus communicates directly with the ports or openings 16.

The other combustion liquid, as gasoline, is supplied through a pipe 30 to an annular end portion 32 of the casing 21, which portion 32 provides a jacket space 33, through which liquid is supplied to the ports or openings 18. An annular partition 35 separates the jacket spaces 22 and 33.

Figure 4:
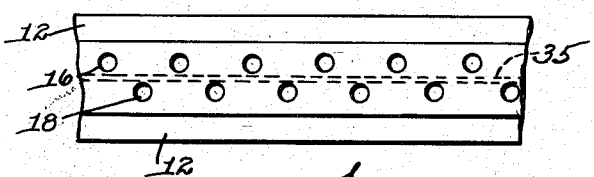
Fig. 4 is a partial inside view of the annular channel member, looking in the direction of the arrow 4 in Fig. 3.

The ports 16 and 18 are alternated circumferentially as shown in Fig. 4, so that jets of the two combustion liquids are injected alternately and tangentially to the annular space S within the channel member 12, in which they proceed to rotate and in which they are effectively intermingled.

Combustion then takes place as the intermingled liquids and vapors come to the inner surface of the rotating stream, and there is little or no tendency to scatter the liquids in the form of small drops, as sometimes occurs where mixing is produced by opposed sprays.

Figure 5:
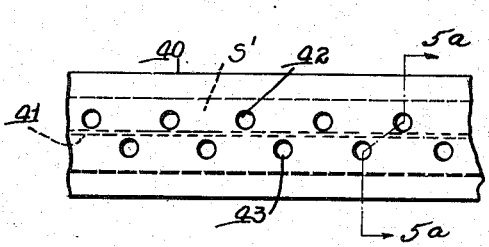
Fig. 5 is a view similar to Fig. 4 but showing a modified construction.
Figure 5A:
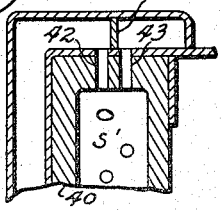
Fig. 5a is a transverse sectional view taken substantially along the line 5a—5a in Fig. 5.

In Figs. 5 and 5a a channel member 40 is shown which is surrounded by a partition 41 outside of the channel space S'. In this construction, the feed openings or ports 42 and 43 are located more closely adjacent the transverse center of the space S' and hence need not be inclined towards the center line of the space S'.

Figure 6:
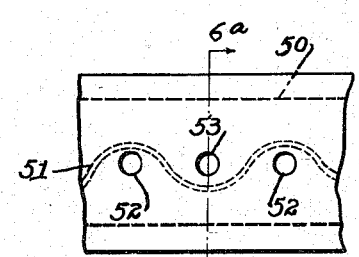
Fig. 6 is also a view similar to Fig. 4 but showing a second modification.
Figure 6A:
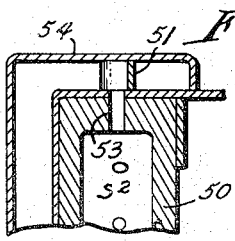
Fig. 6a is a transverse sectional view taken substantially along the line 6a—6a in Fig. 6.

In the construction shown in Figs. 6 and 6a, the channel member 50 is surrounded by a wave-like or serpentine partition member 51, so that the feed openings or ports 52 and 53 to the channel space S² may be located on the center line of the channel member 50, while at the same time they are located at opposite sides of the partition 51 in the outer casing 54.

With all forms of the invention, the combustion liquids are alternately injected and are caused to rotate rapidly in the annular space within the channel member, which conduces to very effective intermingling of the two liquids before combustion takes place.

Having thus described the invention and the advantages thereof, it will be understood that the invention is not to be limited to the details herein disclosed, otherwise than as set forth in the claim, but what is claimed is:

In combustion apparatus having a combustion chamber with an open rearward discharge nozzle and a closed inner end opposite thereto, that improvement which comprises providing a supply member having an internal annular channel open inward to said chamber, means to secure said member within said chamber and at the closed end thereof, a casing surrounding said supply member and the closed inner chamber end, and means to supply two different combustion liquids to said casing, each liquid to a separate portion of said casing, said member and chamber having two series of circumferentially alternated feed openings therethrough to said channel, which feed openings constitute means to feed one combustion liquid to said channel through one of said series of feed openings and means to feed the second combustion liquid to said channel through the other series of alternated feed openings, and all of said feed openings being tangentially inclined and being additionally inclined toward the transverse center of the annular channel to facilitate mixing, and the tangential inclination and circumferential alternation of the feed openings in said two series of feed openings effecting rotation of said mixed liquids in said annular channel.

ESTHER C. GODDARD.
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 1,591,679 | Hawley | July 6, 1926 |
| 1,657,698 | Schutz | Jan. 31, 1928 |
| 1,777,411 | Mayr | Oct. 7, 1930 |
| 2,183,313 | Goddard | Dec. 12, 1939 |
| 2,396,567 | Goddard | Mar. 12, 1946 |
| 2,397,834 | Bowman | Apr. 2, 1946 |
| 2,445,856 | Mayer | July 27, 1948 |

FOREIGN PATENTS

| Number | Country | Date |
|---|---|---|
| 608,242 | Germany | Jan. 21, 1935 |